United States Patent [19]
Frey

[11] Patent Number: 6,039,336
[45] Date of Patent: Mar. 21, 2000

[54] VEHICLE AXLE SUSPENSION ASSEMBLY

[75] Inventor: Christopher Frey, Bessenbach, Germany

[73] Assignee: Otto Sauer Achsenfabrik Keilberg, Bessenbach-Keilberg, Germany

[21] Appl. No.: 08/934,125

[22] Filed: Sep. 19, 1997

[51] Int. Cl.[7] .............................. B60G 7/00; B60G 11/28
[52] U.S. Cl. ............................ 280/124.128; 280/124.132; 280/124.157
[58] Field of Search ..................... 280/124.116, 124.157, 280/124.1, 124.11, 124.128, 124.132

[56] References Cited

U.S. PATENT DOCUMENTS

| | | | |
|---|---|---|---|
| 3,511,332 | 5/1970 | Hickman | 280/124.128 |
| 4,352,509 | 10/1982 | Patton | 280/124.116 |
| 4,537,420 | 8/1985 | Ito et al. | 280/124.128 |
| 5,002,305 | 3/1991 | Raidel | 280/124.116 |
| 5,037,126 | 8/1991 | Gottschalk et al. . | |
| 5,112,078 | 5/1992 | Galazin et al. | 280/124.116 |
| 5,366,237 | 11/1994 | Dilling et al. . | |
| 5,375,871 | 12/1994 | Mitchell et al. | 280/124.157 |
| 5,639,110 | 6/1997 | Pierce | 280/124.11 |

FOREIGN PATENT DOCUMENTS

| | | |
|---|---|---|
| 0 240 649 | 10/1987 | European Pat. Off. . |
| 0 458 665 | 11/1991 | European Pat. Off. . |
| 0 600 198 | 6/1994 | European Pat. Off. . |

*Primary Examiner*—J. J. Swann
*Assistant Examiner*—Christopher Bottorff
*Attorney, Agent, or Firm*—Wenderoth, Lind & Ponack, L.L.P.

[57] ABSTRACT

Axle suspension assembly for suspending a vehicle axle includes a rigid tubular axle body to extend transversely of a vehicle. A radius arm has a front end to be articulated to a chassis of the vehicle. The radius arm is fixed, at a position rearwardly of the front end of the radius arm, to an end of the axle body. The radius arm encompasses a portion only of the axle body in the direction of a circumference thereof, such portion being equal to at least 180° of such circumference. The radius arm is fixed to the axle body, preferably by a welded seam, along all edges of the radius arm bordering the axle body.

27 Claims, 2 Drawing Sheets

VEHICLE AXLE SUSPENSION ASSEMBLY

BACKGROUND OF THE INVENTION

The present invention relates to an axle suspension assembly for suspending or supporting an axle of a vehicle to a chassis thereof. The present invention further relates to a radius arm or suspension arm employed as part of such assembly.

More particularly, the present invention relates to such an assembly including such radius arm and a rigid axle body to extend transversely of the vehicle. The radius arm has a front end to be articulated to the chassis of the vehicle. The radius arm supports an ends of the axle body, and two such radius arms support opposite ends of such axle body, i.e. on opposite sides of a longitudinal center plane of the vehicle. The radius arm is welded to the axle body at a position of the radius arm spaced from the front, articulated end thereof.

An axle suspension assembly of the above general type is disclosed in EP-A-0 600 198. Such known assembly includes a tubular axle body having a uniform wall thickness that is guided through circular openings of a radius arm, such that the axle body is completely surrounded by the radius arm. A sleeve can be positioned on the tubular axle body having the uniform wall thickness, in the region thereof at which the axle body extends through the opening of the radius arm. Such sleeve is in the form of two half-shells that are connected with the axle body by welding. Such axle suspension assembly requires a considerable number of assembly operations and thus is costly. Thus, not only must the axle body be inserted through closed openings of the radius arm, but also reinforcement sleeves must be welded to the axle body, generally requiring four completely circumferential encircling welds.

SUMMARY OF THE INVENTION

It is an object of the present invention to provide an axle suspension assembly of the above described general type, but that requires reduced manufacturing and assembly costs, while providing the same reliability.

It is a further object of the present invention to provide a suspension arm or radius arm employable in such assembly.

These objects are achieved in accordance with the present invention by the provision that the radius arm does not entirely encompass the axle body. Rather, the radius arm encompasses only at least a portion of the axle body in the direction of the circumference thereof. Particularly, the radius arm encompasses at least 180° of the circumference of the axle body. Further, the axle body is fixed to the radius arm, preferably by a continuous welded seam, along all edges of the radius arm that border or confront the axle body. The welded seam between the axle body and all of the edges of the radius arm ensure tension-free and reliable securing of the axle body on the radius arm. If the radius arm encompasses the axle body by 180°, the axle body does not have to be inserted through the radius arm. Rather, the axle body can be introduced, for example, from below the radius arm into recesses thereof, and then can be fixed thereto, for example preferably by welding.

In accordance an advantageous feature of the present invention, the axle body comprises a tubular member and includes in the region of the welded seam a reinforced wall. Thereby, the material flux of the axle body is optimized because the wall thickness is variably adaptable to tension conditions. Due to low tension in the tubular axle body, it is possible to weld even in a tension zone and a compression zone of the tubular axle body, i.e. at the top and bottom thereof. Such welds are difficult to achieve with conventional tubular axle bodies due to the danger of tearing of the wall of the axle body. The reinforced wall region in accordance with the present invention can comprise, under each of the positions of securing of the axle body to the radius arm, at least one annular region of the axle body. The reinforced wall region of the axle body can be achieved by providing either that the outer diameter or the inner diameter of the axle body is substantially constant over its length.

In accordance with a further aspect of the present invention, the radius arm is in the form of a box-shaped body including a bottom wall and two side walls extending, for example, perpendicularly therefrom. The side walls are spaced from each other in the axial direction of the axle body. The side walls partially encompass the axle body. In such case, the welded seam preferably is continuous along all of the edges of the side walls and the bottom wall of the radius arm that border the axle body. In this manner it is possible to obtain an axle suspension assembly with radius arms of low weight and sufficient rigidity. In accordance with a further feature of the present invention, stability can be even further increased if a welded seam is provided along both sides of each side wall.

In accordance with a particularly preferred embodiment of the invention, it has been found to be practically useful for the radius arm to encompasses the axle body by approximately 270°.

The radius arm body has an opening bordering the axle body at another portion of the circumference thereof that is not encompassed by the body of the radius arm. Such opening can extend downwardly. In one embodiment of the present invention the opening extends towards the end of the radius arm that is to be articulated to the vehicle chassis, normally in the forward direction. In such embodiment, the opening is formed in the radius arm, particularly in the side walls thereof, and defines a chamber or space that extends laterally through the radius arm. In accordance with a further feature of the present invention, it is possible to accommodate in such space or chamber a component of a brake of the vehicle. For example, it is possible to accommodate in such space or chamber a brake cylinder of a disk brake assembly of the vehicle. Thereby, such brake cylinder is protected.

BRIEF DESCRIPTION OF DRAWINGS

Other objects, features and advantages of the present invention will be apparent from the following detailed description of embodiments thereof, with reference to the accompanying drawings, wherein.

DETAILED DESCRIPTION OF THE INVENTION

Figure 1:
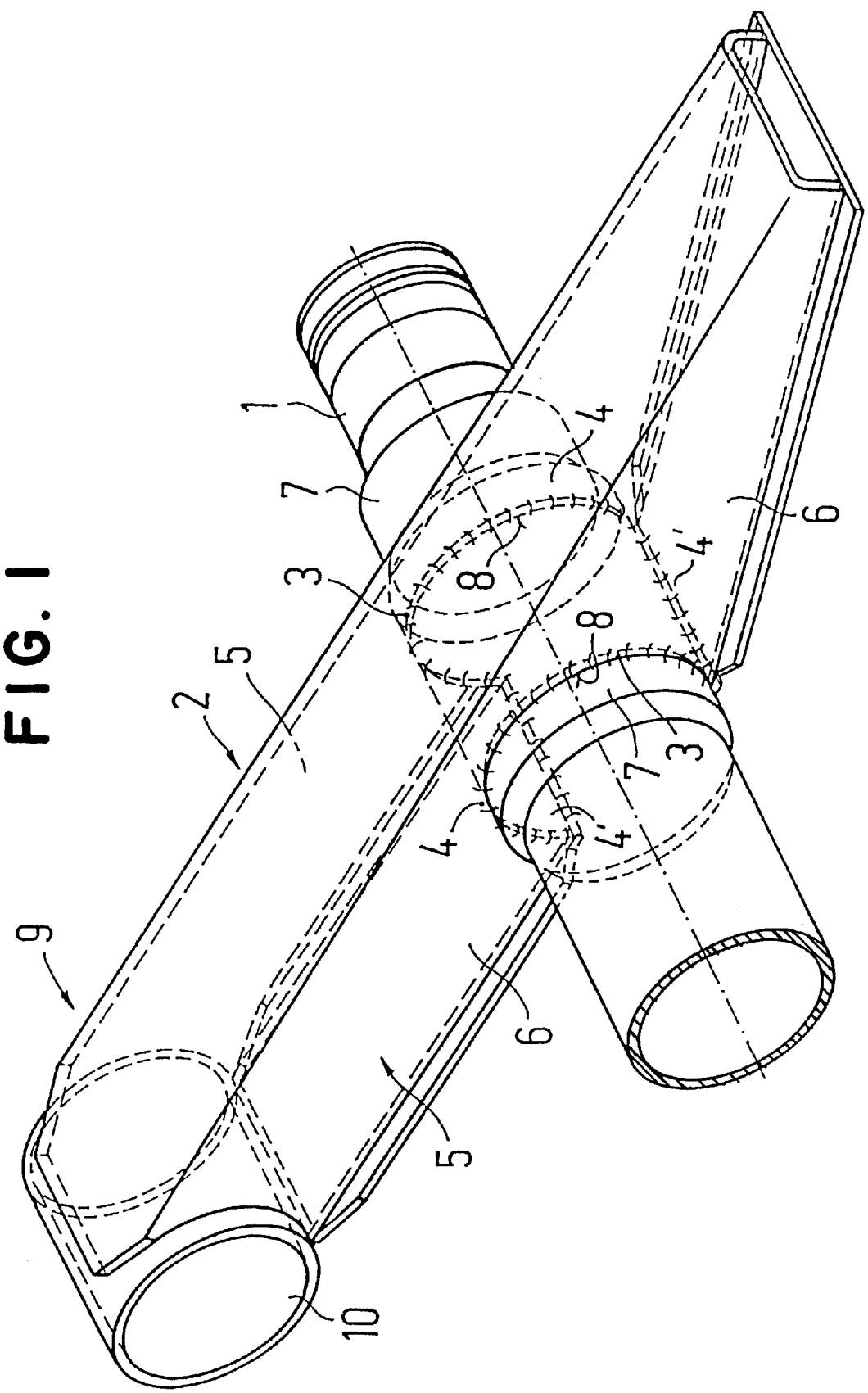
FIG. 1 is a schematic perspective view of an axle suspension assembly in accordance with one embodiment of the present invention.

Shown in FIG. 1 is an axle suspension assembly of one embodiment of the present invention. The assembly includes a rigid tubular axle body 1. Axle body 1 is intended to extend transversely of a vehicle and includes opposite axial ends. Only one end is shown in FIG. 1. Each end of axle body 1 is to be suspended by a respective radius arm or suspension arm 2.

In the embodiment of FIG. 1, the radius arm 2 is generally in the form of a box-shaped body having a bottom wall 6 and two side walls 5 that extend upwardly from bottom wall 6, for example perpendicularly thereto. Side walls 5 are spaced from each other in the axial direction of axle body 1.

Radius arm 2 has an end, for example front end 9, intended to be articulated, for example by a bearing bushing 10, to a bearing bracket 11 (not shown in FIG. 1) that is stationary to the chassis of the vehicle.

At a position spaced from, for example rearwardly of, bearing bracket 11 the radius arm 2 is rigidly welded to axle body 1 such that the axle body thereby is supported. More particularly, side walls 5 of radius arm 2 encompass only a portion of the circumference of axle body 1. In other words, the radius arm does not encompass or extend around the entire circumference or periphery of axle body 1. The portion of the circumference of the axle body 1 that is encompassed by the radius arm is at least 180° of the circumference. Thus, recesses 8 are formed in side walls 5 and define a passage extending laterally or transversely of the radius arm. The axle body 1 fits in recesses 8 that are open, for example in a downward direction as shown in FIG. 1. Axle body 1 is fixed to radius arm 2 along all edges of radius arm 2 that border or confront axle body 1. This particularly is done by a welded seam 3, and preferably welded seam 3 is continuous along all edges of side walls 5 and bottom wall 6 that border axle body 1. As shown in FIG. 1, edges 4 of side walls 5 border axle body 1 circumferentially thereof, and edges 4' of bottom wall 6 border axle body 1 rectilinearly, particularly in directions parallel to the axis of axle body 1. The welded seam 3 extends, preferably continuously, along all of edges 4 and 4'. Thus, welded seam 3 has two circumferentially extending segments along edges 4 and two parallel rectilinear segments along edges 4'.

Tubular axle body 1 has a reinforced wall region 7 in each area of welded seam 3 that runs along the edges 4 of the side walls 5. Reinforced wall region 7 can extend continuously as shown in FIG. 1. In the illustrated arrangement, the outer diameter of axle body 1 is enlarged in the region of welded seam 3 relative to the outer diameter of the remaining portions of axle body 1. The inner diameter of axle body 1 is uniform over the entire length of axle body 1. However, it is also possible to achieve reinforced wall region 7 by providing that outer diameter of the axle body 1 is continuous over the entire length thereof, while the inner diameter is decreased in the area of the region of welded seam 3 relative to the remaining axle body portions.

Figure 2A:
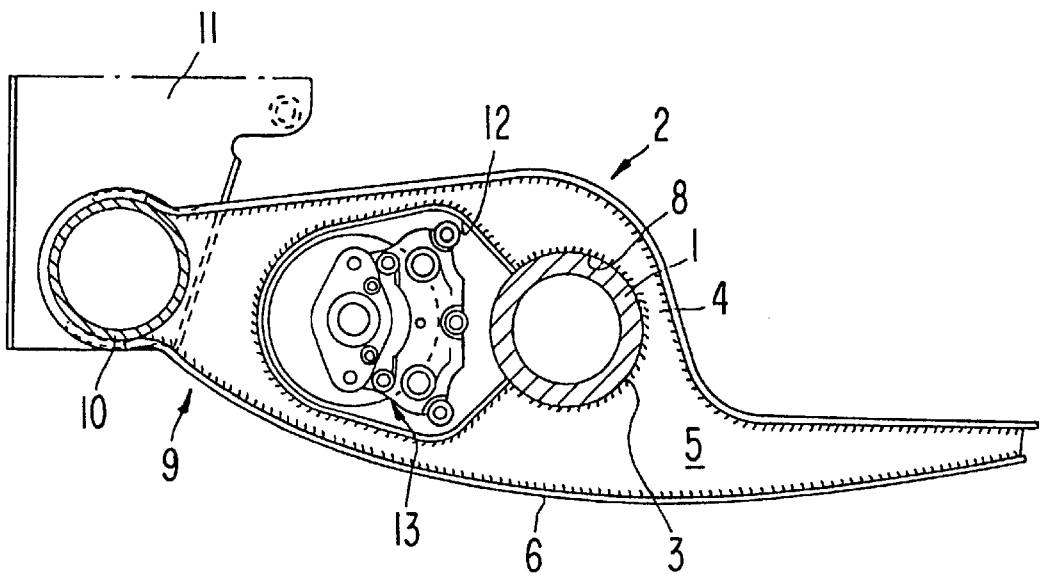
FIG. 2a is a sectional side view illustrating a further embodiment of the present invention, viewed from the outside thereof.
Figure 2B:
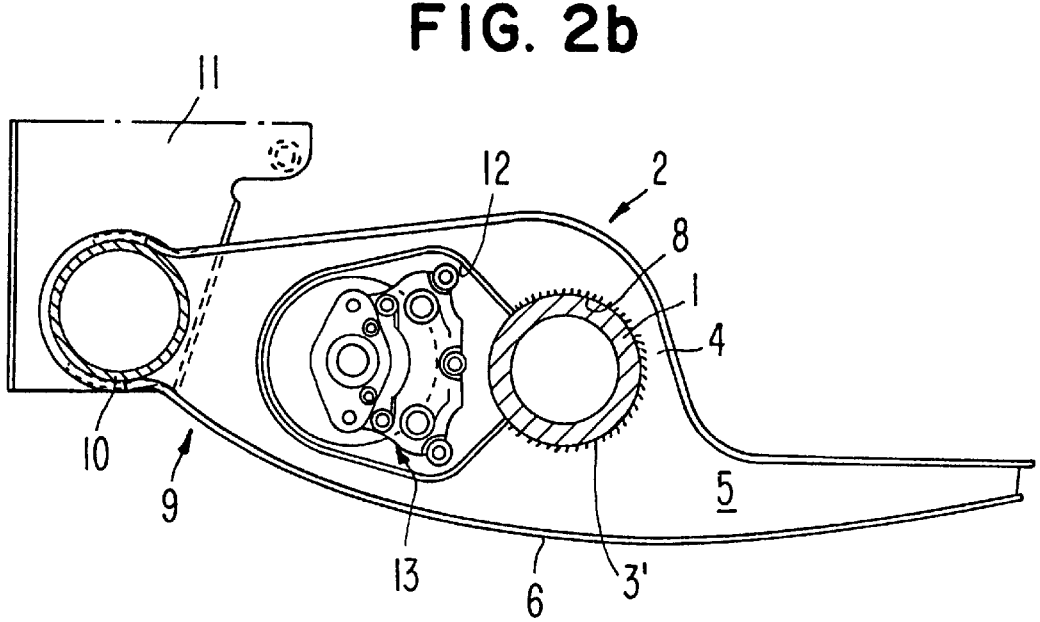
FIG. 2b is a view similar to FIG. 2a, but taken from the inside of the assembly.

FIGS. 2a and 2b illustrate another embodiment of the present invention, wherein the configuration of the box-shaped body of the radius arm is modified. Additionally in this embodiment, a welded seam is provided on each side of each side wall 5 of the radius arm 2. Thus, welded seam 3 runs along the outside as shown in FIG. 2a, and welded seam 3' runs along the inside as shown in FIG. 2b.

An additional feature of this embodiment is that the radius arm 2, and specifically the side walls 5 thereof, encompass the axle body 1 by approximately 270°. The portion of the circumference of axle body 1 that is not encompassed by the radius arm 2 is directed in a direction toward the front end of radius arm 2. This open portion of the axle body 1 defines an opening 12 formed in the radius arm 2, particularly in the side walls 5 thereof. In accordance with a further feature of the present invention such opening can be extended into a space or chamber that extends laterally through the radius arm, and particularly the side walls 5 thereof. This internal chamber of this embodiment can be employed to house a component 13 of a brake of the vehicle. For example, it would be possible to accommodate within such internal space or chamber an axially operating brake cylinder of a disk brake. This would enable optimized protection of such brake cylinder. FIGS. 2a and 2b also illustrate a manner in which radius arm 2 can be articulated, via bushing bearing 10 to bearing bracket 11 that is stationary on the chassis of the vehicle. This illustrates the relationship by which the attachment of the radius arm 2 to the axle body 1 is spaced, for example rearwardly, of the point of articulation of the radius arm.

The present invention has been described and illustrated with respect to preferred embodiments and features thereof. It will be apparent however that various changes and modifications may be made to specifically described and illustrated features, as would be apparent to one of ordinary skill in the art. It is contemplated that all such modifications and changes are intended to be encompassed within the scope of the appended claims, unless specifically excluded therefrom.

I claim:

1. An axis suspension assembly for suspending a vehicle axle, said assembly comprising:

a rigid axle body to extend transversely of a vehicle;

a radius arm having a front end to be articulated to a chassis of the vehicle and a rear end;

said radius arm supporting an end of said axle body, with said radius arm encompassing a portion only of said axle body in the direction of a circumference thereof, said portion being equal to at least 180°;

said radius arm being fixed by a welded seam to said axle body along all edges of said radius arm bordering said axle body; and said axle body comprising a tubular member having a reinforced wall in the region of said welded seam.

2. An assembly as claimed in claim 1, wherein said tubular member has a substantially uniform inner diameter.

3. An assembly as claimed in claim 1, wherein said tubular member has a substantially uniform outer diameter.

4. An assembly as claimed in claim 1, wherein said radius arm is box-shaped and includes a bottom wall and two space side walls extending from said bottom wall, said side walls encompassing said portion of said circumference of said axle body.

5. An assembly as claimed in claim 4, wherein said welded seam extends along edges of said bottom wall and said side walls bordering said axle body.

6. An assembly as claimed in claim 5, wherein said welded seam is continuous along all said edges.

7. An assembly as claimed in claim 5, wherein said welded seam includes circumferential portions extending along said edges of said side walls bordering said axle body.

8. An assembly as claimed in claim 5, wherein said welded seam includes rectilinear portions extending along said edges of said bottom wall bordering said axle body.

9. An assembly as claimed in claim 5, comprising welded seams extending along both sides of said edge of each said side wall bordering said axle body.

10. An assembly as claimed in claim 4, wherein said radius arm has therein an opening bordering said axle body at another portion of said circumference thereof that is not encompassed by said radius arm.

11. An assembly as claimed in claim 10, wherein said opening extends downwardly.

12. An assembly as claimed in claim 10, wherein said opening extends toward said front end of said radius arm.

13. An assembly as claimed in claim 12, wherein said opening is formed in said side walls and defines a chamber extending laterally therethrough.

14. An assembly as claimed in claim 13, further comprising a component of a brake of the vehicle accommodated in said chamber.

15. An assembly as claimed in claim 12, wherein said portion of said axle body encompassed by said side walls of said radius arm is approximately 270° in said direction of said circumference of said axle body.

16. An assembly as claimed in claim 1, wherein said radius arm has therein an opening bordering said axle body at another portion of said circumference thereof that is not encompassed by said radius arm.

17. An assembly as claimed in claim 16, wherein said opening extends downwardly.

18. An assembly as claimed in claim 16, wherein said opening extends toward said front end of said radius arm.

19. An assembly as claimed in claim 18, wherein said opening is formed in said radius arm and defines therein a chamber extending laterally therethrough.

20. An assembly as claimed in claim 19, further comprising a component of a brake of the vehicle accommodated in said chamber.

21. A radius arm to be employed as part of a suspension assembly for suspending an axis of a vehicle, said radius arm comprising;

a radius arm body having therethrough a lateral passage into which is to be fixed an axle body;

said radius army body encompassing a portion only of said passage in the direction of a circumference thereof, said portion being equal to at least 180°; and said radius arm body having therein an opening bordering said passage at another portion of said circumference thereof that is not encompassed by said radius arm body, said opening extending toward said front end of said radius arm, and said opening being formed in said radius arm body and defining therein a chamber extending laterally therethrough.

22. A radius arm as claimed in claim 21, wherein said radius arm body is box-shaped and includes a bottom wall and two space side walls extending from said bottom wall, said side walls encompassing said portion of said circumference of said passage.

23. A radius arm as claimed in claim 22, wherein circumferential edges of said side walls border said passage.

24. A radius arm as claimed in claim 22, wherein rectilinear edges of said bottom wall border said passage.

25. A radius arm as claimed in claim 22, wherein said opening is formed in said side walls.

26. A radius arm as claimed in claim 22, wherein said portion of said passage encompassed by said side walls of said radius arm body is approximately 270° in said direction of said circumference of said passage.

27. A radius arm as claimed in claim 21, wherein said opening extends downwardly.

* * * * *